(No Model.)
J. A. MOSHER.
ELECTRIC ARC LAMP.
No. 582,665. Patented May 18, 1897.
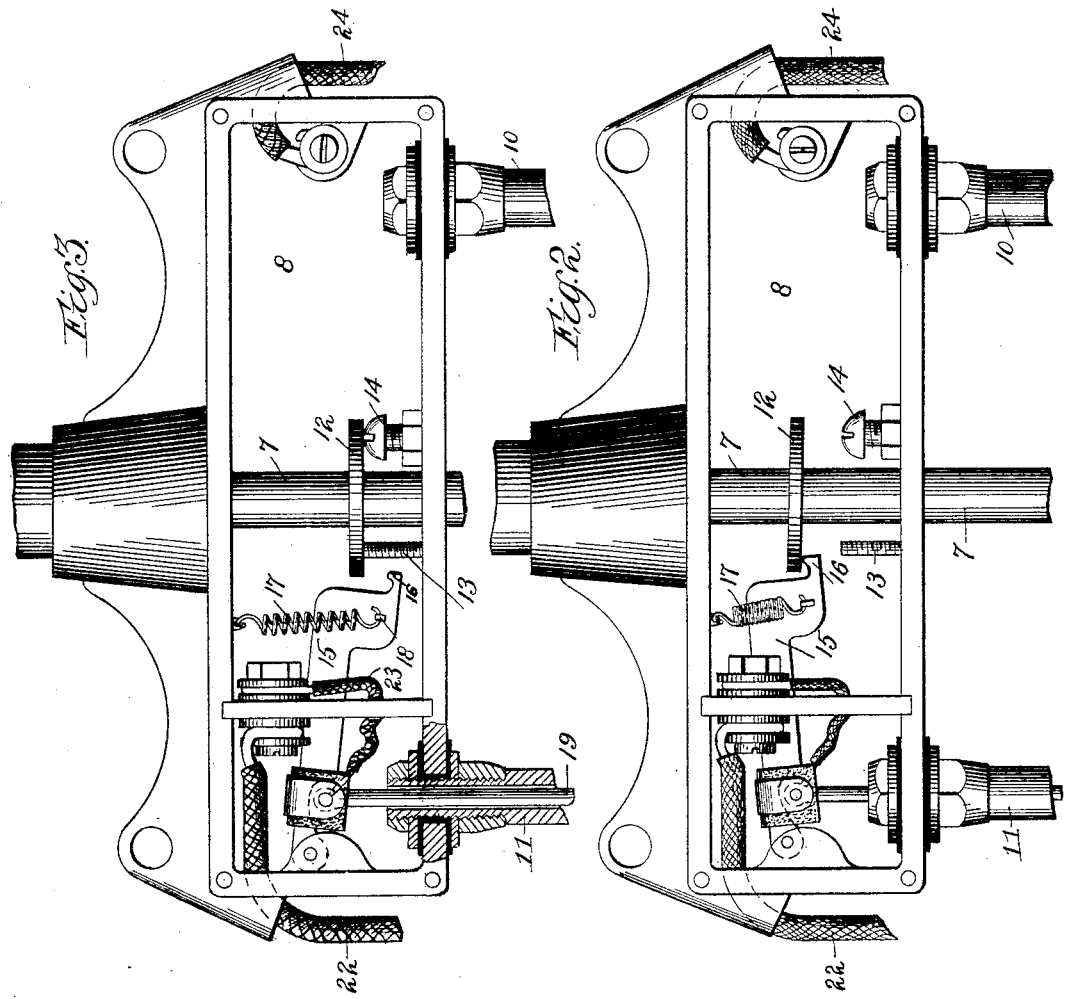
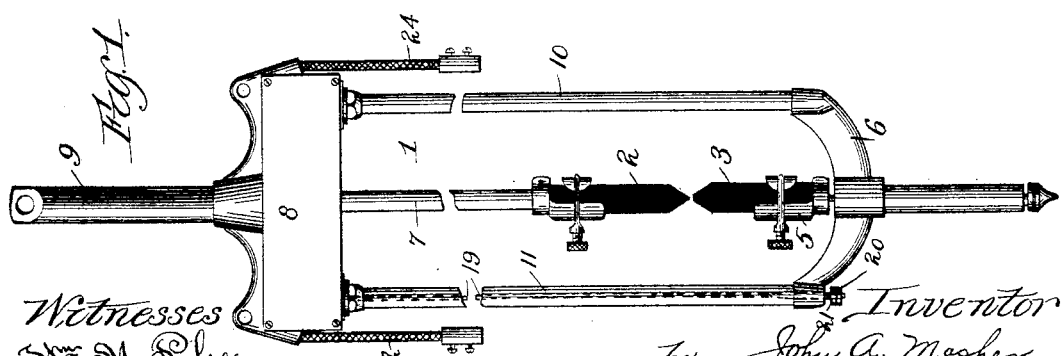
Witnesses
Inventor
John A. Mosher
his Attys

UNITED STATES PATENT OFFICE.

JOHN A. MOSHER, OF CHICAGO, ILLINOIS.

ELECTRIC-ARC LAMP.

SPECIFICATION forming part of Letters Patent No. 582,665, dated May 18, 1897.

Application filed January 19, 1894. Serial No. 497,441. (No model.)

*To all whom it may concern:*

Be it known that I, JOHN A. MOSHER, a citizen of the United States, residing at Chicago, in the county of Cook and State of Illinois, have invented certain new and useful Improvements in Electric-Arc Lamps, of which the following is a specification, reference being had to the accompanying drawings, in which—

Figure 1 is a side elevation. Fig. 2 is an enlarged view of the mechanism controlling the movement of the upper carbon for feeding purposes; and Fig. 3 is a similar view, part being in section.

This invention relates to electric-arc lamps, and has for its object to provide novel, simple, efficient, and economical means for regulating the movement of the upper carbon. This object is accomplished in the manner and by the means hereinafter described, and pointed out in the claim.

Referring to the drawings, 1 indicates a lamp, of which 2 3 are the upper and lower carbons, respectively. The lower carbon is supported in a suitable clamp 5, carried by a bracket 6. The upper carbon is secured to a carbon-rod 7, arranged in a vertical position over the lower carbon in the usual manner. The carbon-rod 7 passes through a box 8, which contains a portion of the feeding mechanism, and into a tube 9, arranged above the box 8, as shown in Fig. 1. The box 8 and bracket 6 are connected by rods 10 11, one of which rods, as 11, is tubular, as shown in Fig. 3 and indicated by dotted lines in Fig. 1.

12 indicates a clutch consisting of a perforated disk which is fitted upon the carbon-rod 7 within the box 8 and is adapted to slide upon the rod 7. The hole in the disk constituting the clutch 12 is of such diameter that when the clutch is tilted slightly it will grip the rod 7 sufficiently to prevent the movement of said rod within the clutch.

13 14 indicate supports arranged at opposite sides of the carbon-rod 7, as shown in Figs. 2 and 3. Such supports are of equal height, so that when the clutch 12 is resting upon them it will be in a horizontal position and at right angles to the carbon-rod 7 and will then permit the carbon-rod to be moved freely. I use on one side two fixed supports 13 and one vertically-adjustable support 14 on the opposite side, forming a triangular base upon which the clutch 12 may rest.

15 indicates a lever which is pivoted to one end of the box 8 and extends to the adjacent edge of the clutch 12, as shown in Fig. 2. The lever 15 is provided with a tooth 16, which projects under the edge of the clutch, as is also shown in Fig. 2.

17 indicates a spring which is connected to the upper portion of the box 8 and to one end of a pin 18, which is carried by the lever 15. I prefer to arrange a spring 17 at each side of the lever 15, so that the action of the springs will be equal at each side of said lever. The springs 17 serve to lift the free end of the lever 15 and their tension is sufficient to lift the carbon-rod and carbon, as will be hereinafter described.

19 indicates a wire the upper end of which is pivotally connected to the lever 15 near the fulcrum thereof, the lower end of said wire being connected to a screw 20, extending through one end of the bracket 6, as shown in Fig. 1.

21 indicates a nut which is adapted to screw upon the screw 20 and to bear against the lower surface of the end of the bracket 6. By adjusting the nut 21 upon the screw 20 the tension of the wire 19 may be adjusted as desired. German silver is preferably used for making the wire 19, as its resistance is practically uniform under wide variations of temperature, and by making the wire of that metal a larger wire may be used with a given amount of current than when any other metal is used.

22 indicates a wire which is insulated from the box 8 and is connected, preferably by an intermediate wire 23, to the wire 19, which is insulated from the lever 15, as shown in Fig. 3. The rods 10 11 are also insulated from the box 8.

24 indicates a second wire which is connected to one end of the box 8 and is in electrical connection therewith, the box 8 being made of some suitable conductor of electricity.

When the lamp is not burning, the carbons 2 3 are in contact. When the lamp is cut into circuit, the current passes in on wire 24, thence through box 8 to carbon-rod 7, thence through carbons 2 3 to bracket 6, thence to wire 19, thence through wire 23 to wire 22. The heat of the current passing through the wire 19 will cause it to expand, thereby permitting the springs 17 to raise the free end of the lever 15. The tooth 16 will thereby be caused to engage one edge of the clutch 12, moving it into an inclined position, and thereby lifting the upper-carbon rod 7 sufficiently to separate the carbons and establish the arc. As the upper carbon is consumed the resistance will increase, less current will pass through the wire 19, and its temperature thereby be reduced, causing it to contract. The free end of the lever 15 will therefore be drawn down, permitting the upper carbon to descend. When the upper-carbon rod 7 has been moved down sufficiently to permit the clutch 12 to rest upon the supports 13 14, the clutch will be moved to a horizontal position, and the carbon-rod will be permitted to slip through it. This movement will increase the current passing through the wire 19, causing its temperature to be raised and the lever 15 to be again operated to separate the carbons to the proper point. The great length of the wire 19 makes it extremely sensitive to the difference in the current passing through it, so that very slight variations in the quantity of the current affect the lever 15, and this effect is still further intensified by connecting the wire 19 to the lever 15 at a point near its fulcrum, as above described. The result is that an exceedingly constant arc is maintained.

In my improved construction either an alternating or direct current may be used with equally good results.

By inclosing the wire 19 in the rod 11 it is protected from the weather and is also protected from variations in the temperature of the surrounding atmosphere, so that it is more sensitive to the influence of the electric current.

That which I claim as my invention, and desire to secure by Letters Patent, is—

In an electric lamp, the combination with the lamp-frame, of a thermo-expansive wire 19, a clutch 12 carried by the upper-carbon rod, a pivoted lever 15 having a tooth 16 adapted to project under one edge of the clutch, said lever being pivotally connected to said wire 19, one or more springs 17 for lifting the free end of said lever, two fixed supports 13 and an adjustable support 14 for supporting said clutch in a horizontal position independently of the lever 15, substantially as described.

JOHN A. MOSHER.

Witnesses:
JAS. A. SHERIFFS,
JNO. L. JACKSON.